United States Patent [19]

Ueno et al.

[11] Patent Number: 5,576,389
[45] Date of Patent: Nov. 19, 1996

[54] POWDER COATING COMPOSITION

[75] Inventors: Tasaburo Ueno; Akimitsu Uenaka; Harunori Gohji; Yuji Toyoda; Kouichi Tsutsui, all of Osaka-fu, Japan

[73] Assignee: Nippon Paint Co., Ltd., Osaka, Japan

[21] Appl. No.: 514,891

[22] Filed: Aug. 14, 1995

Related U.S. Application Data

[63] Continuation of Ser. No. 722,671, Jun. 28, 1991, abandoned.

[30] Foreign Application Priority Data

Jun. 28, 1990 [JP] Japan .................................. 2-171897

[51] Int. Cl.$^6$ .................................................. C08L 33/02
[52] U.S. Cl. ........................... 525/119; 525/176; 525/432; 525/438; 525/934
[58] Field of Search .................................. 525/119, 176, 525/432, 438, 934

[56] References Cited

U.S. PATENT DOCUMENTS

| | | | |
|---|---|---|---|
| 4,321,335 | 3/1982 | Arimoto et al. | 525/116 |
| 4,661,559 | 4/1987 | Gardner et al. | 525/121 |
| 4,937,288 | 6/1990 | Pettit, Jr. et al. | 525/934 |
| 5,008,335 | 4/1991 | Pettit, Jr. | 525/934 |
| 5,034,432 | 7/1991 | Ueno et al. | 525/934 |
| 5,055,524 | 10/1991 | Pettit, Jr. et al. | 525/934 |
| 5,084,508 | 1/1992 | Kagaya et al. | 525/921 |
| 5,098,955 | 3/1992 | Pettit, Jr. | 525/934 |

*Primary Examiner*—James J. Seidleck
*Assistant Examiner*—John M. Cooney, Jr.
*Attorney, Agent, or Firm*—Wenderoth, Lind & Ponack

[57] ABSTRACT

A powder coating comprising a thermosetting resinous composition comprising a base resin having 2 or more oxirane groups in its molecule and a hardener for epoxy resin, which is characterized by further containing 0.5 to 10% by weight based on the base resin weight of a vinyl resin containing 1 to 10% by weight of at least one aliphatic dicarboxylic acid selected from thiomalic acid, maleic acid, fumaric acid and itaconic acid and having a number average molecular weight of 1000 to 8000 and a glass transition temperature of −40° to 100° C. The coating obtained is excellent in smoothness, gloss and image clarity.

8 Claims, No Drawings

POWDER COATING COMPOSITION

This application is a continuation of now abandoned application, Ser. No. 07/722,671, filed Jun. 28, 1991, abandoned.

FIELD OF INVENTION

The present invention relates to a powder coating and more specifically, a powder coating which is capable of producing a cured coating which is excellent in smoothness, gloss, image clarity and the like.

BACKGROUND OF THE INVENTION

A powder coating is generally applied on a substrate by using a fluidized bed dip coating, an electrostatic coating, a powdering, a flame spray coating, a flock coating and the like. Such powder coatings may be based on such resins as plasticized PVC, polyethylenes, nylon, polyesters, cellulosics, epoxy resins, chlorinated polyethers, polyurethanes, fluorine, resins and the like, which are selected so as to be optimum for the selected application means.

Among them, vinyl resin is excellent in chemical resistance, abrasion resistance and electric properties and moreover, is less expensive and hence, is widely used in practice. Also, there has been widely accepted a combination of an epoxy resin and a hardener as such a dicyandiamide, a aromatic amine, amine a complex, an acid anhydride, a phenol resin/acid catalyst and the like, because the resulting coating has excellent chemical resistance, toughness, adhesion properties, weather resistance, thermal resistance, abrasion resistance and electric properties.

Such powder coatings are in general far superior to solvent type coating compositions in respect to hygienic and air-pollution characteristics and therefore are becoming more and more popular in the coating area. However, since there remain problems in achieving coating smoothness, gloss, image clarity and the like, they are in general not suitable as a top coat for automobiles and the like and there is a need for the improvement of such properties.

To these ends, various studies have been made. For example, in Japanese Patent Publication (unexamined) No. 864/81 and Japanese Patent Publication 120666/84, there has been proposed a thermosetting type powder coating comprising a vinyl copolymer composed of glycidyl groups containing vinyl monomers and phosphoric acid ester vinyl monomers and having a particular softening point and a specific number average molecular weight, in combination with an aliphatic dibasic acid hardener; in Japanese Patent Publication (unexamined) No. 47456/81, a powder coating comprising, as main ingredients, a phosphor containing vinyl polymer having crosslinkable functional groups and having a softening point of 70° to 150° C. and a number average molecular weight of 2000 to 30000, and a hardener; and in Japanese Patent Publication (unexamined) No. 87471/82, a powder coating has been proposed comprising a thermosetting type resinous composition containing 0.01 to 10% by weight of phosphor-containing polymeric additive.

However, all of these publications rely upon the use of a phosphor-containing binder resin or phosphor-containing polymeric additive, and do not satisfactorily achieve the intended objects and effects. There are also problems in respect to public hygiene and health, environmental air-pollution and the like because of the presence of the phosphor component. Therefore, there is always a demand for powder coatings which do not rely on the use of a phosphor-containing binder resin or additive, and which can be used as a top coat for automobile body and the like.

It is therefore, an object of the invention to provide a powder coating which is free from phosphor-containing polymer and is useful as a top coat for automobile body and the like, and which is also capable of producing a cured coating with excellent smoothness, gloss, image quality, weather resistance, and the like.

SUMMARY OF THE INVENTION

According to the present invention, the abovementioned object can be attained with a powder coating comprising a thermosetting type powder coating resinous composition comprising, as resinous components, a base resin having 2 or more oxirane groups in its molecule and a hardener for the epoxy resin, which is characterized by being further containing a vinyl resin containing 1 to 10% by weight of at least one aliphatic dicarboxylic acid component selected from the group consisting of thiomalic acid, maleic acid, fumaric acid and itaconic acid and having a number average molecular weight of 1000 to 8000 and a glass transition temperature of −40° to 100° C., in an amount of 0.5 to 10% by weight of the powder coating.

In this invention, as a resinous vehicle of a thermosetting type powder coating, a combination of a base resin having 2 or more oxirane groups in its molecule and a hardening agent for an epoxy resin is used.

As the base resin, the following may be satisfactorily used, providing they have 2 or more oxirane groups.
(1) acrylic resins:

Copolymers comprising 20 to 50% by weight of other ethylenically unsaturated monomers and having a glass transition temperature of 30° to 75° C. and a number average molecular weight of 1500 to 10000.

Examples of glycidyl group containing monomers are glycidyl acrylate, glycidyl methacrylate, methyl glycidyl acrylate, methyl glycidyl methacrylate, glycidyl ether of allyl alcohol, glycidyl ether of methallyl alcohol, methyl glycidyl ether of allyl alcohol, methyl glycidyl ether of methallyl alcohol, N-glycidyl acrylamide, vinyl sulfonic acid glycidyl and the like. They are used each alone or in combinations of 2 or more.

Other monomers to be copolymerized with said glycidyl group containing monomer are such members which are inert to said glycidyl group, i.e. which are unable to react with said glycidyl group at a mixing or kneading temperature; examples of monomers capable of entering in the copolymerization with the abovementioned glycidyl group containing monomers are acrylates, methacrylates and other ethylenically unsaturated monomers. They are also used each singularly or in the combination of 2 or more.

Typical examples of such acrylates of methacrylates are methyl acrylate, ethyl acrylate, n-propyl acrylate, isopropyl acrylate, n-butyl acrylate, isobutyl acrylate, t-butyl acrylate, cyclohixyl acrylate, 2-ethyl hexyl acrylate, octyl acrylate, 2-ethyloctyl acrylate, dodecyl acrylate, benzyl acrylate, methyl methacrylate, ethyl methacrylate, n-propyl methacrylate, isopropyl methacrylate, n-buryl methacrylate, iesobutyl methacrylate, t-butyl methacrylate, hexyl methacrylate, cyclohexyl methacrylate, 2-ethylhexyl methacrylate, octyl methacrylate, 2-etyloctyl methacrylate, benzyl methacrylate, dodecyl methacrylate, phenyl methacrylate, 2-hydroxyethyl acrylate, 2-hydroxyethyl methacrylate, 2-hydroxypropyl acrylate, 2-hydroxypropyl methacrylate and the like.

Examples of other ethylenically unsaturated monomers are dialkyl fumarates, such as diethyl fumarate, dibutyl fumarate and the like; dialkyl itaconates such as diethyl itaconate, dibutyl itaconate and the like; styrene, vinyl toluene, α-methyl styrene, acrylonitrile, methacrylonitrile, acrylamide, methacrylamide, methylol acrylamide, alkoxy methylolamide, vinyl oxazoline, vinyl acetate, vinyl propionate, lauryl vinyl ether and the like. They may be used each alone or in a combination of two or more.

(2) Polyester resins:

Conventional polyesters for coating use, modified to include epoxy groups and epoxy-containing polyester resins. Examples of polyhydric alcohol to be used in the preparation of such polyester resin are ethyleneglycol, propyleneglycol, neopentylglycol, 1,6-hexanediol, 1,3-butyleneglycol, 1,4-butyleneglycol, bis(hydroxyethyl)terephthalate, hydrogenated bisphenol A, trimethylol ethane, trimethylol propane, glycerin, pentaerythritol, 1,4-cyclohexane dimethanol or alkyleneoxide addition product thereof, and such epoxy compounds as Cardula E.

Examples of mono- and poly-basic carboxylic acids are phthalic acid, isophthalic acid, terephthalic acid, het acid, trimellitic acid, succinic acid, oxalic acid, adipic acid, sebacic acid, benzoic acid, p-t-butyl benzoic acid, p-hydroxy benzoic acid, acrylic acid, methacrylic acid, and their anhydrides, hydrogenated products or methyl esters. Introduction of the epoxy group may be carried out in any conventional way among them, addition of a polyfunctional epoxy compound may be one of the easiest ways of introducing such epoxy groups.

(3) Epoxy resins:

Typical examples are monoepoxides, such as $C_1$ to $C_8$-alkyl glycidyl ether, allyl glycidyl ether, phenyl glycidyl ether, styrene oxide, $C_1$–$C_4$ alkylphenyl glycidyl ether, glycidyl versatate and the like; di- or poly-epoxides as $C_4$–$C_6$ alkylene glycidyl ether type epoxy resins, bisphenol glycidyl ether type epoxy resins, bisphenol methyl glycidyl ether type epoxy resins, novolak type epoxy resins and the like; and epoxy esters obtained by the esterification of a part of the epoxy groups in said di- or poly-epoxides with oil fatty acids, benzoic acid, acrylic acid or methacrylic acid. One or a combination of two or more of said epoxy resins may be satisfactorily used.

In this invention, although it is not always necessary, the abovementioned base resin may be modified with 0.05 to 10% by weight, preferably 0.1 to 5% by weight, of an acid phosphate and used as a base resin.

Examples of such acid phosphates are methyl acid phosphate, isopropyl acid phosphate, butyl acid phosphate, dibutyl acid phosphate, monobutyl acid phosphate, 2-ethylhexyl acid phosphate, di-2-ethylhexyl acid phosphate, diisodecyl acid phosphate, monoisodecyl acid phosphate, dodecyl acid phosphate, and the like. At that time, taking due consideration of the dispersion properties, water resistance and the like of the powder coating, said acid phosphate should be controlled in a range of 0.05 to 10%, preferably 0.1 to 5%, of the base resin weight.

As a hardening agent for the epoxy resins amine compounds may be satisfactorily used, providing they are solid at room temperatures and having comparatively low reactivities. However, the most preferable members are acid anhydrides, polybasic acids and the like. Examples are glutaric acid, adipic acid, pimeric acid, suberic acid, azelaic acid, sebacic acid, 1,12-dodecane diacid, 1,20-eicosane diacid, citric acid, maleic acid, citraconic acid, itaconic acid, glutaconic acid, phthalic acid, isophthalic acid, hexahydrophthalic acid, cyclohexene 1,2-dicarboxylic acid and the like. They may be acid anhydrides as succinic anhydride, sebacic anhydride, phthalic anhydride, itaconic anhydride, trimellitic anhydride and the like. Also included are polyesters having 2 or more carboxyl groups in the molecule.

According to this invention, there is added to the thermosetting type powder coating, comprising the abovementioned based resin and the hardening agent, a particular amount of particular vinyl resin to improve the smoothness, gloss, image clarity and the like.

The present vinyl resin is characterized by containing as a constituting component, 1 to 10% by weight of an aliphatic dicarboxylic acid selected from the group consisting of thiomalic acid, maleic acid, fumaric acid and itaconic acid, and having a glass transition temperature of −40° to 100° C. and a number average molecular weight of 1000 to 8000.

In the case of thiomalic acid, the defined amount of thiomalic acid is used as a polymerization regulator in the polymerization of vinyl monomers and said acid may be located at the end portion of the formed polymer chain.

In the case of maleic acid, fumaric acid or itaconic acid, such unsaturated acid may be used as a part of the vinyl monomers, thereby incorporating said acid into the polymer chain structure.

The present vinyl resin may be easily accomplished by effecting polymerization of α,β-ethylenically unsaturated monomers with or without the abovementioned aliphatic unsaturated dicarboxylic acid in the presence of conventional polymerization catalyst and polymerization regulator, whose glass transition temperature may be freely controlled by the kind and amount ratio of the monomers used and number average molecular weight and by the polymerization conditions and by the selection of the polymerization regulator.

However, in this invention, it is essential that the content of said aliphatic dicarboxylic acid in the vinyl resin be in a range of 1 to 10% by weight of the total resin.

Though the exact reasons why the presence of such acid in the vinyl resin is contributive toward the marked improvements in smoothness, gloss and image clarity of the cured coating are not yet clear, the inventors are of the opinion that on one hand, the vinyl resin itself will become an integral part of the cured coating resin through the reaction of said acid groups in the curing reaction of the powder coating, and on the other hand, that the vinyl resin may be localized, as in the case of a surfactant, at the coating surface due to the polarity and non-polarity of the acid groups of dicarboxylic acid and main chain of the vinyl resin, thereby contributing to the improvements in smoothness, gloss and image clarity of the cured coating.

At any rate according to this invention, a particular amount of said particular acid should be present in the vinyl resin. This is because, if the acid content is less than 1% by weight, one cannot expect to achieve the desired effects and if the said content exceeds the upper limit of 10% by weight, there is indeed the desired improvement in coating appearance, but there is an undesired loss in weather resistance, impact strength and the like.

The glass transition temperature of the vinyl resin is also important in this invention, as well as the number average molecular weight thereof.

If the glass transition temperature is lower than −40° C., there is a tendency to lower the weather resistance and impact strength of the coating, whereas if it exceeds over 100° C., there is a considerable loss in coating appearance. If the number average molecular weight of the vinyl resin is less than 1000, there is a decrease in impact strength and if it exceeds 8000, there is a marked loss of coating appearance. Therefore, the present vinyl resin should have a glass transition temperature of –40°–100° C. and a number average molecular weight of 1000–8000, and preferably 2000–6000.

In this invention, such properties as smoothness, gloss, image clarity and the like of the cured coating are greatly improved by the inclusion of such vinyl resin in a thermosetting type resinous composition comprising as main ingredients, a base resin and a hardening agent, in an amount of about 0.5 to 10% by weight, and preferably 1 to 5% by weight of the base resin weight. If the said amount is less than 0.5%, one cannot expect to achieve the desired effects of the vinyl resin, and if it exceeds 10% by weight, there are undesired loss in weather resistance, impact strength and other coating properties.

The vinyl resin may be added to the powder coating composition at any stage in the preparation of the powder coating up to the melt dispersion of the said coating composition.

The powder coating may be either a clear or colored composition. Any of the conventional additives may be satisfactorily used in this powder coating.

Examples are inorganic or organic pigments customarily used in such powder coating.

Typical examples of inorganic pigments are zinc oxide, carbon black, titanium oxide, antimony white, black iron oxide, red iron oxide, red lead, cadmium yellow, zinc sulfide, lithopone, barium sulfate, lead sulfate, barium carbonate, white lead, alumina white and the like.

Typical examples of organic pigments are azo pigments poly condensation azo pigments metal complex azo pigments, benzimidazolone pigments, phthalocyanine pigments (blue, green), thioindigo pigments, anthraquinone pigments, flavanthrone pigments, indanthrene pigments, anthrapyridine pigments, pyranthrone pigments, isoindolinone pigments, perylene pigments, perinone pigments and quinacridone pigments. However, there are only illustrative and various other pigments customarily used may be successfully employed.

The present powder coating may be added with other conventional additives, as desired, including various resins as epoxy resins, polyester resins, polyamide resins, cellulose derivatives and the like; pigments, flow regulators, anti-blocking agents, ultra violet ray absorbers, benzoin, anti-static agents, antioxidants and the like.

The present powder coating may be advantageously prepared by pre-mixing the essential three components of the abovementioned base resin, hardening agent and vinyl resin, together with other optional components as various resins, pigments, flow regulators, anti-blocking agents, UV absorbers, benzoin, antistatic agents, antioxidants or the like, melt-mixing by means of heat roll, extruder and other mixing machines, cooling the melt and pulverizing the solid mass.

The present powder coating may be applied on a substrate by using a conventional coating method as, for example, electrostatic spraying, fluidization dip coating and the like, and the thus applied coating is usually baked in a baking furnace maintained at 150°–210° C. to obtain a cured coating.

The thus-obtained coating is far superior to conventional coatings in respect to the coating smoothness, gloss and image clarity and hence, the present powder coating is specifically useful for the coating of automobile bodies and the like.

The present invention shall be now more fully explained in the following Examples. Unless otherwise stated, all parts and percentages are by weight.

Reference Example 1

Preparation of acrylic resin

Into a flask fitted with a dropping funnel, a stirrer and a thermometer, was placed 95 parts of xylene and heated to 130° C. To this, there was added from dropwise a dropping funnel, a mixture of 25 parts of styrene, 27 parts of methyl methacrylate, 30 parts of glycidyl methacrylate and 4 parts of Kayaester O (initiator) in 3 hours. After completion of said addition, the content was maintained at the same temperature for 30 minutes and then a mixture of 4 parts of xylene and 0.4 part of Kayaester O was dropped added in 1 hour. Thereafter, the combined mixture was maintained at 130° C. for 2 hours and xylene was distilled off under reduced pressure to obtain an acrylic resin A.

Reference Example 2

Preparation of acrylic resin

Into a flask fitted with a dropping funnel, a stirrer and a thermometer, were placed 95 parts of xylene and heated to 130° C. To this, there was added dropwise, from a dropping funnel, a mixture of 20 parts of styrene, 34 parts of methyl methacrylate, 30 parts of glycidyl methacrylate, 10 parts of n-butyl methacrylate and 4 parts of Kayaester O (initiator) in 3 hours. After completion of said addition, the content was maintained at the same temperature for 30 minutes and then a mixture of 4 parts of xylene and 0.4 part of Kayaester O was dropwise added in 1 hour. Thereafter, the combined mixture was maintained at 130° C. for 2 hours, and there was added dropwise, a mixture of 3 parts of butyl acid phosphate and 10 parts of xylene at 130° C. in 1 hour and then xylene was distilled off under reduced pressure to obtain an acrylic resin B.

Reference Examples 3–4

Preparation of acrylic resins

Following the procedures of Reference Example 2 and using the materials shown in Table 1, acrylic resins C and D were prepared, respectively.

Reference Examples 5–8

Preparation of levelling agents

Following the procedures of Reference Example 1 and using the materials shown in Table 1(1), 1(2) levelling agents E,F,G and H were prepared, respectively.

EXAMPLE 1

Preparation of an acryl powder coating 100 parts of an acrylic resin A, 24 parts of decane dicarboxylic acid, 2 parts of levelling agent E were dry-mixed in a Henshel Mixer and then subjected to melt dispersion at 100° C. by using Co-kneader PR-46 (trademark, Bus. Co., Swiss). After cooling, the solid mass was pulverized in a Hammer Mill and shieved through a 150 mesh wire net to obtain an acryl powder coating.

The thus-obtained powder coating was applied on a steel plate by electrostatic spraying and baked at 160° for 20 minutes to obtain a cured coating (about 80μ thickness).

The appearance impact strength of the thus obtained coating were examined and the test results were shown in Table 2. Appearance was excellent.

EXAMPLE 2

Preparation of acryl powder coating 100 parts of an acrylic resin B, 24 parts of decane dicarboxylic acid, 30 parts of titanium oxide CR 50 (trademark of a Ishihara Sangyo) and 2 parts of levelling agent E were dry-mixed in a Henshel Mixer (trademark of Mitui Miike Seisakusho) and then subjected to melt dispersion at 100° C. by using a Co-kneader PR-46 (trademark, Bus Co., Swiss). After cooling, the solid mass was pulverized in a Hammer Mill and shieved through a 150 mesh wire net to obtain an acryl powder coating.

The thus-obtained powder coating was applied on a steel plate by electrostatic spraying and baked at 160° C. for 20 minutes to obtain a cured coating (about 80μ thickness).

The appearance and impact strength of thus obtained coating are examined and the test results were shown in Table 2. Appearance was excellent.

EXAMPLES 3 to 5

Preparation of acryl powder coatings

Following the procedures of Example 2 and using the materials shown in Table 2, various acryl powder coatings were prepared.

Each of thus obtained powder coating was applied on a steel plate by electrostatic spraying and baked at 160° C. for 20 minutes to obtain a cured coating (about 80μ thickness).

The appearance and impact strength of the thus obtained coating are examined and the test results were shown in Table 2. Appearance was excellent, in each case.

EXAMPLE 6

Preparation of polyester powder coating

Into a flask fitted with a dropping funnel, a stirrer and a thermometer, was placed 100 parts of ER 6610 (trademark, polyester resin, manufactured by Nippon Polyester Co., Ltd.) and 5 parts of bi-functional Epoxy ERL-4234 (Union Carbide Co.) and the mixture was heated at 120° C. for 1 hour and then cooled.

105 parts of the polyester resin thus obtained, 3 parts of the levelling agent E, 36 parts of Kurelan UI (blocked isocyanate, trademark, BASF) and ,40 parts of titanium oxide CR 50 were dry-mixed in a Henshel Mixer (trademark of Mitui Miike Seisakusho) and then subjected to melt dispersion at 100° C. by using Co-kneader PR-46 (trademark, Bus Co., Swiss). After cooling, the solid mass was pulverized in a Hammer Mill and shieved through a 150 mesh wire net to obtain a a powder coating.

The thus-obtained powder coating was applied on a steel plate by electrostatic spraying and baked at 180° C. for 20 minutes to obtain a cured coating (about 80μ thickness).

The appearance and impact strength of thus obtained coating are examined and the test results were shown in Table 2. Appearance was excellent.

EXAMPLE 7

Preparation of epoxy powder coating 100 parts of Epotohto YD-014 (trademark, epoxy resin, manufactured by Tohto Kasei), 2 parts of the levelling agent F,3 parts of dicyandiamide and 40 parts of titanium oxide CR 50 were dry-mixed in a Henshel Mixer (trademark of Mitui Miike Seisakusho) and then subjected to melt dispersion at 100° C. by using a Co-kneader PR-46 (trademark, Bus Co., Swiss). After cooling, the solid mass was pulverized in a Hammer Mill and shieved through a 150 mesh wire net to obtain a powder coating.

The thus-obtained powder coating was applied on a steel plate by electrostatic spraying and baked at 180° C. for 20 minutes to obtain a cured coating (about 80μ thickness).

The appearance and impact strength of thus obtained coating are examined and the test results were shown in Table 2. Appearance was excellent.

Comparative Example 1

Preparation of acryl powder coating 100 parts of the acrylic resin A and 24 parts of decane dicarboxylic acid were dry-mixed in a Henshel Mixer (trademark of Mitui Miike Seisakusho) and then subjected to melt dispersion at 100° C. by using a Co-kneader PR-46 (trademark, Bus Co., Swiss). After cooling, the solid mass was pulverized in a Hammer Mill and shieved through a 150 mesh wire net to obtain an acryl powder coating.

The thus-obtained powder coating was applied on a steel plate by electrostatic spraying and baked at 160° C. for 20 minutes to obtain a cured coating (about 80μ thickness).

The appearance and impact strength of the thus obtained coating are examined and the test results were shown in Table 3. Appearance was no good.

Comparative Example 2

Preparation of acryl powder coating 100 parts of an acrylic resin B, 24 parts of decane dicarboxylic acid and 30 parts of titanium oxide CR 50 (Ishihara Sangyo) were dry-mixed in a Henshel Mixer (trademark of Mitui Miike Seisakusho) and then subjected to melt dispersion at 100° C. by using a Co-kneader PR-46 (trademark, Bus Co., Swiss). After cooling, the solid mass was pulverized in a Hammer Mill and shieved through a 150 mesh wire net to obtain an acryl powder coating.

The thus-obtained powder coating was applied on a steel plate by electrostatic spraying and baked at 160° C. for 20 minutes to obtain a cured coating (about 80μ thickness).

The appearance and impact strength of thus obtained coating are examined and the test results were shown in Table 3. Appearance was no good.

Comparative Examples 3 to 6

Preparation of acryl powder coatings

Following the procedures of Example 2 and using the materials shown in Table 3, various acryl powder coatings were prepared.

Each of thus obtained powder coatings was applied on a steel plate by electrostatic spraying and baked at 160° C. for 20 minutes to obtain a cured coating (about 80μ thickness).

The appearance and impact strength of thus obtained coating are examined and the test results were shown in Table 2. Appearance was no good, in each case.

Comparative Example 7

Preparation of polyester powder coating

Into a flask fitted with a dropping funnel, a stirrer and a thermometer, was placed 100 parts of ER 6610 (trademark, polyester resin, manufactured by Nippon Polyester Co., Ltd.) and 5 parts of bi-functional Epoxy ERL-4234 (Union Carbide Co.) and the mixture was heated at 120° C. for 1 hour and then cooled.

105 parts of the polyester resin 1 thus obtained, 3 parts of the levelling agent E, 36 parts of Kurelan UI(blocked isocyanate, trademark, BASF) and ,40 parts of titanium oxide CR 50 were dry-mixed in a Henshel Mixer (trademark of Mitui Miike Seisakusho) and then subjected to melt dispersion at 100° C. by using Co-kneader PR-46 (trademark, Bus Co., Swiss). After cooling, the solid mass was pulverized in a Hammer Mill and shieved through 150 mesh wire net to obtain a powder coating.

The thus-obtained powder coating was applied on a steel plate by electrostatic spraying and baked at 180° C. for 20 minutes to obtain a cured coating (about 80μ thickness).

The appearance and impact strength of thus obtained coating are examined and the test results were shown in Table 3. Appearance was no good.

Comparative Example 8

Preparation of epoxy powder coating 100 parts of Epotohto YD-014 (trademark, epoxy resin, manufactured by Tohto Kasei), 2 parts of the levelling agent F, 3 parts of dicyandiamide and 40 parts of titanium oxide CR 50 were dry-mixed in a Henshel Mixer (trademark of Mitui Miike Seisakusho) and then subjected to melt dispersion at 100° C. by using a Co-kneader PR-46 (trademark, Bus Co., Swiss). After cooling, the solid mass was pulverized in Hammer Mill and shieved through 150 mesh wire net to obtain a powder coating.

The thus-obtained powder coating was applied on a steel plate by electrostatic spraying and baked at 180° C. for 20 minutes to obtain a cured coating (about 80μ thickness).

The appearance and impact strength of the thus obtained coating are examined and the test results were shown in Table 3(1), 3(2). Appearance was no good.

Evaluation Methods:
1) Appearance (smoothness)
   (1) visual examination
       o . . . good
       Δ . . . fairly no good
       X . . . no good
   (2) Ra (roughness of surface center)
   Surface roughness meter was used. Coating thickness: 80
   Ra=S/L
   wherein L stands for length and S is the total area of an oblique lines divergence from a straight line. Roughness is increased in proportion to the increase in Ra value.
2) Impact strength: ½ inch hard ball with 500 g weight was dropped from various hights perpendicularly onto the coated plate and tolerable hight withoutn damage was measured. Impact strength was expressed by this hight (cm).

TABLE 1(1)

| | Ref. Example | | | |
|---|---|---|---|---|
| | 1 | 2 | 3 | 4 |
| acrylic resin | A | B | C | D |
| Solvent xylene | 95 | 95 | 95 | 95 |
| Monomers | | | | |
| Styrene | 25 | 20 | 20 | 20 |
| methyl methacrylate | 27 | 34 | 38 | 9 |
| glycidyl methacrylate | 30 | 30 | 30 | 30 |
| n-butyl methacrylate | — | 16 | — | 41 |
| 2-ethyl hexyl methacrylate | 18 | — | 10 | — |
| 2-hydroxyethyl methacrylate | — | — | 2 | — |
| thiomalic acid | — | — | — | — |
| maleic acid | — | — | — | — |
| Intiator 1st | | | | |
| AIBN | — | — | — | — |
| KayaEsterO | 4 | 4 | 4 | 4 |
| Intiator 2nd | | | | |
| AIBN | — | — | — | — |
| KayaEsterO | 0.4 | 0.4 | 0.4 | 0.4 |
| xylene | 4 | 4 | 4 | 4 |
| acid phosphate | — | 3 | — | — |
| butyl acid phosphate | | | | |
| ethyl acid phosphate | — | — | 5 | 20 |

TABLE 1(1)-continued

| | Ref. Example | | | |
|---|---|---|---|---|
| | 1 | 2 | 3 | 4 |
| resin characteristics glass trans temp. | 50 | 60 | 60 | 40 |
| number. average molecular weight | 4000 | 4000 | 4000 | 4000 |

TABLE 1(2)

| | Ref. Example | | | |
|---|---|---|---|---|
| | 5 | 6 | 7 | 8 |
| levelling agent | E | F | G | H |
| Solvent xylene | 95 | 95 | 95 | 95 |
| Monomers | | | | |
| Styrene | — | — | — | — |
| methyl methacrylate | 75 | 1 | 8 | — |
| glycidyl methacrylate | — | — | — | — |
| n-butyl methacrylate | 19 | 80 | 70 | 70 |
| 2-ethyl hexyl methacrylate | — | 16 | — | 8 |
| 2-hydroxyethyl methacrylate | 6 | — | 2 | 18 |
| thiomalic acid | 3 | 5 | — | — |
| maleic acid | — | — | 20 | 4 |
| Intiator 1st | | | | |
| AIBN | 0.5 | 0.5 | — | — |
| KayaEsterO | — | — | 2.5 | 0.5 |
| Intiator 2nd | | | | |
| AIBN | 0.05 | 0.05 | — | — |
| KayaEsterO | — | — | 0.5 | 0.05 |
| xylene | 5 | 4 | 4 | 4 |
| acid phosphate | — | — | — | — |
| butyl acid phosphate | | | | |
| ethyl acid phosphate | — | — | — | — |
| resin characteristics glass trans temp. | 80 | 30 | 100 | 35 |
| number average molecular weight | 4000 | 2000 | 6000 | 20000 |

TABLE 2(1)

| | Ex. 1 acryl clear coat. comp. | Ex. 2 acryl coat. comp. | Ex. 3 acryl coat. comp. | Ex. 4 acryl coat. comp. |
|---|---|---|---|---|
| acryl resin A | 100 | — | 100 | — |
| acryl resin B | — | 100 | — | 100 |
| acryl resin C | — | — | — | — |
| acryl resin D | — | — | — | — |
| ER 6610 1) | — | — | — | — |
| YD-014 | — | — | — | — |
| levelling agent E | 2 | 2 | — | 7 |
| levelling agent F | — | — | 4 | 4 |
| levelling agent G | — | — | — | — |
| levelling agent H | — | — | — | — |
| CR 50 | — | 30 | 30 | 30 |
| DDA | 24 | 24 | 24 | 24 |
| dicyan- | — | — | — | — |

TABLE 2(1)-continued

|  | Ex. 1 acryl clear coat. comp. | Ex. 2 acryl coat. comp. | Ex. 3 acryl coat. comp. | Ex. 4 acryl coat. comp. |
|---|---|---|---|---|
| diamide | — | — | — | — |
| kureran UI | — | — | — | — |
| Appearance visnal | O | O | O | O |
| Ra | 0.8 | 0.9 | 0.9 | 0.9 |
| Properties impact | 40< | 40< | 40< | 40< |

1) polyester resin 1

TABLE 2(2)

|  | Ex. 5 acryl coat. comp. | Ex. 6 polyester coat. comp. | Ex. 7 epoxy coat. comp. |
|---|---|---|---|
| acryl resin A | — | — | — |
| acryl resin B | — | — | — |
| acryl resin C | 100 | — | — |
| acryl resin D | — | — | — |
| ER 6610 | — | 105 | — |
| YD-014 | — | — | 100 |
| levelling agent E | — | 3 | — |
| levelling agent F | 4 | — | 2 |
| levelling agent G | — | — | — |
| levelling agent H | — | — | — |
| CR 50 | 30 | 40 | 40 |
| DDA | 24 | — | — |
| dicyandiamide | — | — | 3 |
| kureran UI | — | 36 | — |
| Appearance visnal | O | O | O |
| Ra | 0.9 | 1.0 | 1.0 |
| Properties impact | 40< | 40< | 40< |

TABLE 3(1)

|  | Comp. Ex. 1 | Comp. Ex. 2 | Comp. Ex. 3 | Comp. Ex. 4 |
|---|---|---|---|---|
| acryl resin A | 100 | — | — | 100 |
| acryl resin B | — | 100 | — | — |
| acryl resin C | — | — | — | — |
| acryl resin D | — | — | 100 | — |
| ER 6610 1) | — | — | — | — |
| YD-014 | — | — | — | — |
| levelling agent E | — | — | 2 | — |
| levelling agent F | — | — | — | — |
| levelling agent G | — | — | — | 3 |
| levelling agent H | — | — | — | — |
| CR 50 | — | 30 | 30 | 30 |
| DDA | 24 | 24 | 24 | 24 |
| dicyandiamide | — | — | — | — |
| kureran UI | — | — | — | — |
| Appearance visnal | Δ | Δ | Δ | Δ |
| Ra | 1.2 | 1.4 | 1.1 | 1.2 |
| Properties impact | >40 | 10 | 10 | 30 |

1) polyester resin

TABLE 3(2)

|  | Comp. Ex. 5 | Comp. Ex. 6 | Comp. Ex. 7 | Comp. Ex. 8 |
|---|---|---|---|---|
| acryl resin A | 100 | — | — | — |
| acryl resin B | — | 100 | — | — |
| acryl resin C | — | — | — | — |
| acryl resin D | — | — | — | — |
| ER 6610 1) | — | — | 105 | — |
| YD-014 | — | — | — | 100 |
| levelling agent E | — | 20 | 3 | — |
| levelling agent F | — | — | — | 2 |
| levelling agent G | — | — | — | — |
| levelling agent H | — | — | — | — |
| CR 50 | 30 | 30 | 40 | 40 |
| DDA | 24 | 24 | — | — |
| dicyandiamide | — | — | — | 3 |
| kureran UI | — | — | 36 | — |
| Appearance visnal | Δ | Δ | X | X |
| Ra | 1.1 | 1.2 | 1.4 | 1.4 |
| Properties impact | 25 | 10 | >40 | >40 |

1) polyester resin

What is claimed is:

1. A thermosetting powder coating composition consisting essentially of (A) a base resin having 2 or more oxirane groups in its molecule, said base resin being selected from the group consisting of a polyester resin and an epoxy resin, (B) an effective hardening amount of a hardener for an epoxy resin selected from the group consisting of amines, polybasic acids, acid anhydrides, and polyesters which have 2 or more carboxyl groups in the polyester molecule, and (C) 0.5% to 10% by weight of the base resin of a vinyl resin, said vinyl resin containing 1 to 10% by weight, based on the weight of the vinyl resin, of at least one aliphatic dicarboxylic acid component selected from the group consisting of thiomalic acid, maleic acid, fumaric acid and itaconic acid and having a number average molecular weight of 1000 to 8000 and a glass transition temperature of −40° to 100° C.

2. A thermosetting powder coating composition consisting essentially of (A) a base resin having 2 or more oxirane groups in its molecule, said base resin being an acrylic resin obtainable by copolymerizing glycidyl group containing monomers and other monomers which are inert to said glycidyl group, (B) an effective hardening amount of a hardener for an epoxy resin selected from the group consisting of amines, polybasic acids, acid anhydrides, and polyesters which have 2 or more carboxyl groups in the polyester molecule, and (C) 0.5% to 10% by weight, of the base resin of a vinyl resin, said vinyl resin containing 1 to 10% by weight, based on the weight of the vinyl resin, of at least one aliphatic dicarboxylic acid selected from the group consisting of thiomalic acid, maleic acid, fumaric acid and itaconic acid and having a number average molecular weight of 1000 to 8000 and a glass transition temperature of −40° to 100° C.

3. A thermosetting powder coating composition according to claim 2, wherein the acrylic resin is a copolymer obtained by the copolymerization of 20 to 50% by weight of a glycidyl group containing monomer and 80 to 50% by weight of other copolymerizable α, β-ethylenically unsaturated monomers, excluding carboxyl containing monomers, said acrylic base resin having a glass transition temperature of 30° to 75° C. and a number average molecular weight of 1500 to 10000.

4. A thermosetting powder coating composition according to claim 1, wherein the base resin is modified with 0.05 to 10% by weight of an alkyl or dialkyl acid phosphate.

5. A thermosetting powder coating composition according to claim 2, wherein the base resin is modified with 0.05 to 10% by weight of an alkyl or dialkyl acid phosphate.

6. A thermosetting powder coating composition according to claim 4 or 11, wherein the acid phosphate is selected from the group consisting of methyl acid phosphate, isopropyl acid phosphate, butyl acid phosphate, monobutyl acid phosphate, 2-ethylhexyl acid phosphate, di-2-ethylhexyl acid phosphate, diisodecyl acid phosphate, monoisdecyl acid phosphate and dodecyl acid phosphate.

7. A thermosetting powder coating composition according to claim 1, wherein the aliphatic dicarboxylic acid component contained in the vinyl resin is thiomalic acid.

8. A thermosetting powder coating composition according to claim 2, wherein the aliphatic dicarboxylic acid component contained in the vinyl resin is thiomalic acid.

* * * * *